United States Patent (10) Patent No.: US 11,637,614 B2
Mokh et al. (45) Date of Patent: Apr. 25, 2023

(54) SPATIAL MODULATION METHOD AND RECEIVER DEVICE THEREFOR

(71) Applicant: INSTITUT NATIONAL DES SCIENCES APPLIQUÉES DE RENNES (INSA de RENNES), Rennes (FR)

(72) Inventors: Ali Mokh, Cesson Sevigne (FR); Maryline Helard, Rennes (FR); Yvan Kokar, Rennes (FR); Matthieu Crussiere, Laille (FR); Jean-Christophe Prevotet, Vitre (FR)

(73) Assignee: INSTITUT NATIONAL DES SCIENCES APPLIQUÉES DE RENNES (INSA de RENNES), Rennes (FR)

( * ) Notice: Subject to any disclaimer, the term of this patent is extended or adjusted under 35 U.S.C. 154(b) by 1298 days.

(21) Appl. No.: 16/075,979

(22) PCT Filed: Feb. 3, 2017

(86) PCT No.: PCT/FR2017/050253
§ 371 (c)(1),
(2) Date: Aug. 6, 2018

(87) PCT Pub. No.: WO2017/134403
PCT Pub. Date: Aug. 10, 2017

(65) Prior Publication Data
US 2021/0194567 A1 Jun. 24, 2021

(30) Foreign Application Priority Data
Feb. 5, 2016 (FR) ...................................... 1600202

(51) Int. Cl.
*H04B 7/08* (2006.01)
*H04L 25/03* (2006.01)

(52) U.S. Cl.
CPC ........... *H04B 7/0874* (2013.01); *H04L 25/03* (2013.01)

(58) Field of Classification Search
CPC ..... H04B 7/0874; H04B 7/0617; H04L 25/03; H04L 1/06
See application file for complete search history.

(56) References Cited

U.S. PATENT DOCUMENTS

| | | | |
|---|---|---|---|
| 7,924,945 B2 * | 4/2011 | Bouvet | H04L 1/06 375/349 |
| 2006/0079221 A1 * | 4/2006 | Grant | H04B 7/0697 455/423 |
| 2013/0003884 A1 * | 1/2013 | Legouable | H04B 7/0617 375/267 |

FOREIGN PATENT DOCUMENTS

| | | | | |
|---|---|---|---|---|
| CA | 2787813 A1 * | 11/2008 | | H04B 7/0671 |
| FR | 2954629 A1 | 6/2011 | | |

(Continued)

OTHER PUBLICATIONS

Machine Translation of JP-2011091581-A. (Year: 2022).*

(Continued)

*Primary Examiner* — Jean B Corrielus

(57) ABSTRACT

Some embodiments are directed to a method of transmission from at least one transmit antenna to all or some of n reception antennas including at least one transmission step suitable for transmitting a first binary information item by using the absence of focusing from the transmit antenna to any one of the n reception antennas, during a predetermined integer number k of symbol times and/or a modulation of the power transmitted by at least one transmit antenna, participating in a coding of a second binary information item. Some other embodiments are directed to a receiver-decoder suitable for reception according to the method.

12 Claims, 2 Drawing Sheets

(56) References Cited

FOREIGN PATENT DOCUMENTS

JP          2011091581 A  *  5/2011    ............. H04B 7/155
JP          2013504916 A      2/2013

OTHER PUBLICATIONS

Dinh-Thuy, P.-H., et al., "Receive antenna shift keying for time reversal wireless communications," Communications (ICC), 2012 IEEE International Conference on, IEEE, Jun. 10, 2012, pp. 4852-4856, XP032273684.

Chang, R. Y., et al., "New Space Shift Keying Modulation with Hamming Code-Aided Constellation Design," IEEE Wireless Communications Le I I Ers, IEEE, Piscataway, NJ, US, vol. 1, No. 1, Feb. 1, 2012, pp. 2-5, XP011414172.

International Search Report and Written Opinion for PCT Patent App. No. PCT/FR2017/050253 (dated May 18, 2017) with English translation of the ISR.

Search Report from French Patent App. No. 1600202 (dated Nov. 23, 2016).

\* cited by examiner

SPATIAL MODULATION METHOD AND RECEIVER DEVICE THEREFOR

CROSS REFERENCE TO RELATED APPLICATIONS

This application is a national phase filing under 35 C.F.R. § 371 of and claims priority to PCT Patent Application No. PCT/FR2017/050253, filed on Feb. 3, 2017, which claims the priority benefit under 35 U.S.C. § 119 of French Patent Application No. 1600202, filed on Feb. 5, 2016, the contents of each of which are hereby incorporated in their entireties by reference.

BACKGROUND

Some embodiments relate to digital communications via radio electrical transmission. Some embodiments relate more particularly to the increase in the transmission capacity of a channel in a multi-antenna system implementing spatial modulation.

Related art modulation techniques exist for the implementation of systems of transmissions via emission and reception of radioelectric signals. Recently, among the various existing modulations, techniques of spatial modulations have appeared in which the activation of one or more emitters respectively emitting to one or more receivers over a predetermined time interval encodes information besides the data that can be carried by the use of another modulation (transmission of a symbol). These spatial modulations include RASK modulation (from the acronym "Receive Antenna Shift keying") and RSM (from the acronym "Receive Spatial Modulation"), for example.

The French patent application FR 09 591 52, titled "PROCEDE DE TRANSMISSION D'UN SIGNAL SOURCE, PROCEDE DE RECEPTION D'UN SIGNAL EMIS, EMETTEUR, RECEPTEUR, SIGNAL ET PROGRAMMES D'ORDINATEUR CORRESPONDANTS", published under the no 2 524 229 (France Telecom, 17 Dec. 2009), describes a method for transmitting a source signal including a plurality of binary sequences, to NR receiver antennas, with NR greater than or equal to two. According to the method described in this document, in a prefiltering operation, for a binary sequence of the source signal, focusing towards at least one of the receiver antennas, called target antenna, is implemented. Moreover, again according to this method, the target antenna and the associated focusing prefiltering are chosen according to a value of the binary sequence intended to be emitted.

This type of modulation has a ratio, between the complexity of implementation and the channel capacity, that can be enhanced or improved.

SUMMARY

Some embodiments are therefore directed to a transmission method, allowing at least the capacity of a telecommunications channel implementing spatial modulation to be enhanced or improved by a method for transmission, from at least one emitter antenna, of a signal including a plurality of binary sequences, to all or part of n receiver antennas, n being an integer greater than or equal to 2, the method implementing, before a step of emitting one of the binary sequences of the source signal, a possible prefiltering of focusing the binary sequence towards target antennas out of the n receiver antennas, and the possible associated focusing prefiltering being chosen according to a value of the first binary sequence, the method further including:

at least one step of transmission suitable for transmitting a first piece of information (binary or M-ary) by using the simultaneous and deliberate absence of focusing towards each of the n receiver antennas, during a predetermined integer k of symbol times (durations), and, optionally, a modulation of the power emitted by the at least one emitter antenna, contributing to an encoding of a second piece of information (binary or M-ary).

Either an absence of activation of any one beam towards these antennas (zero emission power) or, for all the activated beams, emission of a power substantially reduced below a predetermined power threshold is considered to be a deliberate absence of focusing towards all of the n receiving antennas.

According to an embodiment, the second piece of binary information and the first piece of information together form the same single piece of binary information that can be interpreted as such.

Advantageously, the integer k of symbol times is less than or equal to a predetermined number, such as 5 for example.

Advantageously, the power modulation includes a selection of an interval of power values among a predetermined integer p of intervals of power values.

According to an embodiment, for each new symbol time, the number of receiving antennas RAn, targeted by activation of a beam (in emission), varies and can be between 0 and n.

Some embodiments also relate to a receiver device arranged for receiving and decoding at least one binary sequence of a signal including a plurality of binary sequences, the sequence having been subjected, before its emission by a remote emitter, to a prefiltering of focusing towards none or few, one or a plurality of target antennas out of n receiver antennas, and the associated focusing prefiltering being chosen according to a value of the binary sequence.

Here, the terms "prefiltering of focusing" towards one or more antennas mean a set of operations aiming to define which emission beams must or should be activated (and consequently which beams must or should be deactivated) according to a sequence to be transmitted for a symbol time.

Thus, carrying out prefiltering does not necessarily imply the presence of an activated beam after the prefiltering, but the transposition between the sequence and the combination of antennas to be targeted, which combination can include the case of total absence of beams (of antenna(s) to be targeted).

The receiver device further includes:

a module for decoding a first piece of binary information transmitted and at least partially encoded by using the deliberate absence of focusing towards all of the antennas connected to the receiver, from at least one remote emitter, during a predetermined integer k of symbol times, and/or a module for decoding a second piece of binary information encoded by modulation of the power emitted by at least one remote emitter antenna.

Finally, some embodiments relate to a computer program product that can be loaded directly into the internal memory of a computer including portions of software code for the execution of the steps of the method described above when this program is executed on a computer.

BRIEF DESCRIPTION OF THE FIGURES

Some embodiments will be better understood, and other particularities and advantages will appear upon reading the following description, the description referring to the appended drawings, among which.

DETAILED DESCRIPTION OF EXEMPLARY EMBODIMENTS

In FIGS. 1 to 4, the modules shown are functional units, which may or may not correspond to physically distinguishable units. For example, these modules or some of them are grouped together into a single component, or include or consist of the functionalities of the same software. A contrario, according to other embodiments, certain modules include or consist of separate physical entities.

Figure 1:
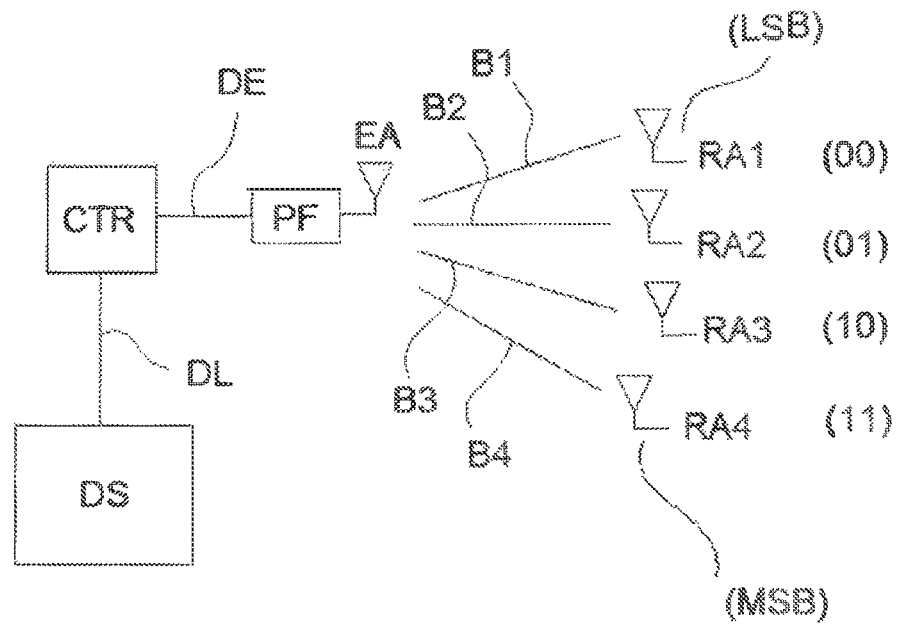
FIG. 1 shows a system for communications of data via radio frequencies according to a RASK technique belonging to the related art.

FIG. 1 shows a system for communications of data via communication of radio frequencies according to a technique belonging to the related art. This system implements RASK modulation (from the acronym "Receive Antenna Shift Keying"). The emitter EA is suitable for creating one or more beams B1, B2, B3, B4 towards one or more receiver antennas RA1, RA2, RA3 and RA4. The emitter antenna EA operates in particular according to a focusing prefiltering implemented by a prefiltering module PF that controls the presence or the absence of each of the beams B1, B2, B3, B4 according to a logical word to be transmitted, received from an input link DE of the prefiltering module PF. According to this technique, there is usually at least one active beam. Logical information (or logical words) to be transmitted from the antenna EA, are provided sequentially to the prefiltering module PF via the link DE, under the control of a controller CTR. The controller CTR reads the information to be transmitted from a source of data DS, and through a link DL. All of the characteristics of the elements for control CTR, prefiltering PF, transfer of the data over the links DL and DE, are not described any further here, since they are well known to a person of ordinary skill in the art of digital devices and modulations and are not useful for the comprehension of the modulation system described.

The controller CTR, the prefiltering module PF and the emitter antenna EA together form an emitter station implementing a technique for communication of data (transmission of data) including RASK spatial modulation.

According to this technique, a lookup table (mapping) of correspondence between combinations of binary values (binary words or fragments of binary words) and a target antenna out of the set of target antennas is established.

Thus, for example, the antenna RA1 assigned to the lowest binary weight, corresponds to the binary sequence 00. Likewise, the binary sequence 01 is assigned to the antenna RA2, and the sequences 10 and 11 are assigned to the antennas RA3 and RA4 of FIG. 1, respectively. Here, RA4 is associated with the binary element having the greatest weight.

If the binary sequence "00101101" comes from the source of data DS, in order to be emitted from the emitter antenna EA, under the control of the controller CTR, the focusing prefiltering module PF allows the sequential creation of the transmission beams B1 (for the word "00"), then B3 (for the word "10"), then B4 (for the word "11") and finally B2 (for the word "01"), according to the predefined lookup table.

The prefiltering PF thus implements a technique of spatial focusing (also called pre-encoding).

It is known that this technique further applies to a plurality of emitter antennas EAi transmitting to one or more receiving antennas RAj.

This technique is based on a predefined correspondence between binary values (binary words, fragments of binary words) and target antennas respectively associated with these values.

Figure 2:
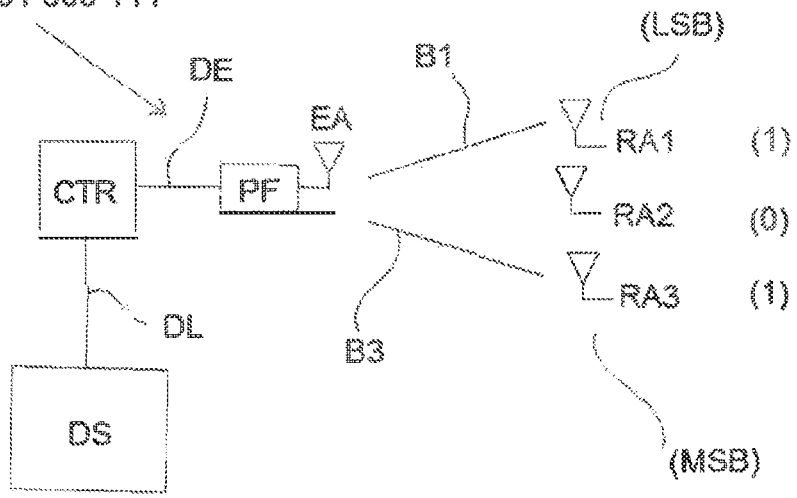
FIG. 2 shows a system for telecommunication of data via radio frequencies according to a specific and non-limiting embodiment, during a first symbol time.

FIG. 2 shows a system for telecommunication of data via radio frequencies according to a specific and non-limiting embodiment. The system according to some embodiments includes an emitter EA suitable for creating one or more beams B1, B2, B3 towards one or more receiver antennas RA1, RA2 and RA3. The emitter antenna EA operates in particular according to a focusing prefiltering implemented by a prefiltering module PF that controls the presence or the absence of each of the beams B1, B2 (not shown in the drawing) and B3 according to a logical word to be transmitted, received from an input link DE of the prefiltering function. Logical information (or logical words) to be transmitted from the antenna EA, is provided sequentially to the prefiltering module PF via the link DE, under the control of a controller CTR. The controller CTR reads the information to be transmitted from a source of data DS, and through a link DL. All of the characteristics of the elements for control CTR, prefiltering PF, transfer of the data over the links DL and DE, are not described any further here, since they are well known to a person of ordinary skill in the art and are not useful for the comprehension of some embodiments.

The controller CTR, the prefiltering module PF and the emitter antenna EA together form an emitter station according to some embodiments implementing a technique for communication of data (transmission of data) including a new spatial modulation.

Cleverly, the spatial modulation used allows a first piece of binary information SEQ1 to be transmitted by using the absence of focusing towards any one of the n receiver antennas RA, during one or more symbol times.

Indeed, the spatial modulation technique according to the advantageous or preferred embodiment is based on the following principle:

for each of the receiving antennas RAn, the detection (of the presence) of a beam represents a value of a reception binary element and the absence of a detected beam represents the other binary value possible for the same element. Thus, the presence of a beam on a receiver antenna can correspond to a logical "1" and its absence to a logical "0" or vice versa.

Advantageously, an absence, during one or more symbol times, of all of the beams of the channel used that can possibly be activated B1, B2 and B3, contributes to encoding a piece of information that can be transmitted over the channel. This is not possible with a spatial modulation according to the related art.

The capacity of the transmission channel between EA and the three antennas RA1, RA2 and RA3 is therefore:

C=n, where n is the number of receiving antennas.

That is C=3 for the example described.

Advantageously, the number of antennas used for the spatial modulation technique according to some embodiments is not necessarily a power of two, contrary to the principle known implemented in the spatial modulations according to the related art (example: RASK).

The capacity of a transmission channel in RASK, for example, between an emitter and three receiving antennas, is:

$$C_{RASK} = \log_2 n$$

That is, for three receiving antennas with a single emitter, the capacity of the channel when using RASK modulation is equal to 1.584963.

Thus, the implementation of the technique of spatial modulation according to some embodiments allows the ratio between the complexity of implementation and the capacity of the used telecommunications (transmission) channel to be advantageously enhanced or improved.

Here, the terms "symbol time" and "symbol duration" mean the elementary duration of transmission associated with the transmission of each of the discernible symbols that can be transmitted by the transmission channel used.

FIG. 2 shows the transmission of a fragment (triplet) "101" of the binary sequence SEQ1 (having the value "101000111") during a first symbol time TS1. According to the principle described above, the focusing prefiltering module carries out an activation of the transmission beams B1 and B3 and the absence of the transmission beam B2 during the symbol time TS1. Thus, the activated beam B1 encode a logical "1", the deactivated beam B2 encodes a logical "0", and the present transmission beam B3 encodes a logical "1". The triplet of binary elements ("0" or "1") received by the antennas RA1, RA2 and RA3 encodes the logical sequence "101" for the reconstruction, on the receiving end, of the transmitted sequence SEQ 1.

Figure 3:
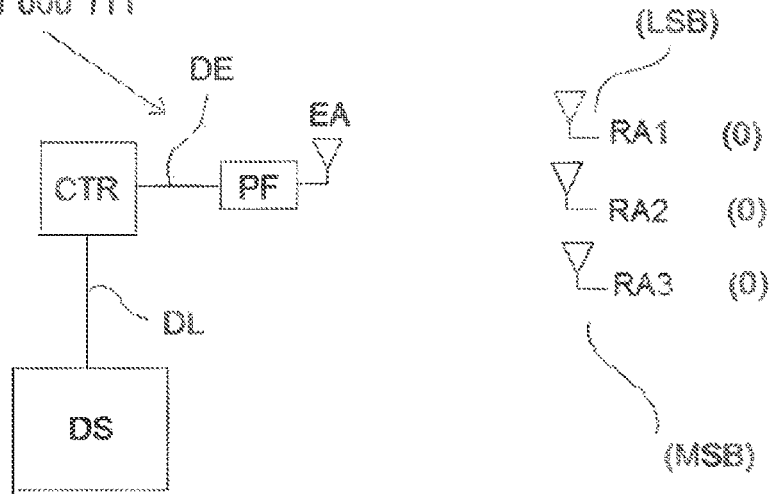
FIG. 3 shows the telecommunications system already shown in FIG. 2, during a second symbol time.

According to the same principle, FIG. 3 shows the emission, during a symbol time TS2 following TS1, of the subsequent fragment (triplet) of binary elements in the sequence SEQ1. For this sequence, the value of which is equal to "000", the focusing prefiltering module carries out a simultaneous deactivation of the three transmission beams B1, B2 and B3. This step (during the symbol time TS2) of the transmission corresponds to the reception of the sequence portion "000" of SEQ1.

Figure 4:
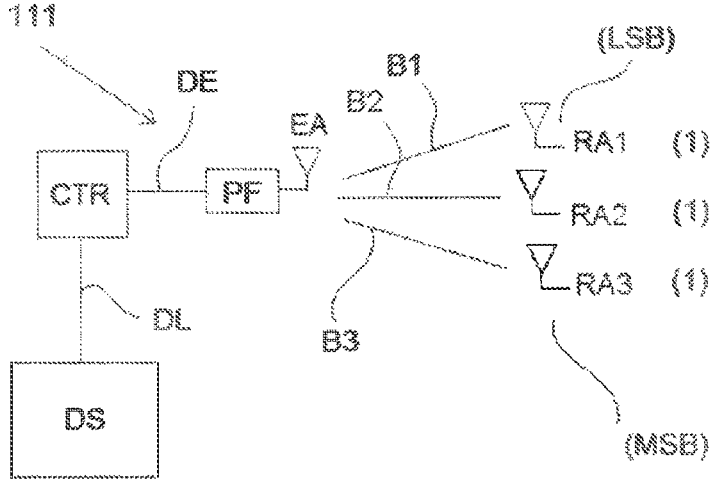
FIG. 4 shows the telecommunications system already shown in FIGS. 2 and 3, during a third symbol time.

Finally, and according to the same principle of spatial modulation, FIG. 4 shows the transmission of the triplet "111" of the sequence SEQ1, during a symbol time TS3 following TS2. During this symbol time TS3, the three beams B1, B2 and B3 are simultaneously activated by the focusing prefiltering module PF.

FIGS. 2, 3 and 4 together illustrate the transmission, by fragments (triplets), of the sequence SEQ1 shown, having the value "101000111".

Of course, according to the same principle it is possible to transmit any binary sequence SEQ, during a period including an integer multiple of k symbol times.

Again according to the same principle, it is possible to transmit a binary sequence SEQ over a transmission channel implementing a plurality of emitters EAn towards a plurality of receiving antennas RAn.

According to a second embodiment, the transmission system carries out a power modulation for each of the beams B1, B2 and B3. Thus, the power of each of the beams is chosen from a multiplicity p of predefined power ranges (intervals), according to the binary sequence to be transmitted during a symbol time.

According to the second embodiment, one or more receiver/decoder modules connected to one or more antennas RAn is (are) suitable for distinguishing various levels of powers that are used and contribute to the encoding of a binary sequence SEQ transmitted during a symbol time. To do this, the receiver/decoding module includes one or more systems for detecting a level of received power.

Advantageously, the first and second embodiment described and used for the transmission of a first and of a second piece of binary information (binary sequence), respectively, can be combined. The first and second piece of information thus form a single piece of information transmitted by a spatial modulation according to the advantageous or preferred embodiment described (the first embodiment above) and furthermore using a power modulation as described above in the second embodiment.

The reconstitution of a sequence SEQ transmitted according to the principle of spatial modulation described uses a receiver REC suitable for receiving and decoding at least this binary sequence SEQ.

The sequence SEQ transmitted to the receiver REC, and received by the receiver was subjected, before its emission towards one or more target antennas out of the n antennas RAn of remote EA, to the focusing prefiltering by PF, and optionally to a power modulation transmitted via the beams Bn.

The receiver/decoder REC thus includes, in order to carry out a reconstitution of the sequence:
  a module DEC1 for decoding a first piece of binary information transmitted and at least partially encoded by using the deliberate absence of focusing towards any one (or absence towards all) of the antennas connected to the receiver REC, from at least one remote emitter, during a predetermined integer k of symbol times,
  and/or a module DEC2 for decoding a second piece of binary information encoded by modulation of a power emitted by at least one remote emitter antenna EA.

According to an alternative embodiment, the modules DEC1 and DEC2 can be the same.

The presently disclosed subject matter not only relates to the embodiment described above, but more broadly relates to any spatial modulation for which a total or partial encoding of information can be carried out by the simultaneous absence of transmission beams towards each of the antennas used for reception, during one or more symbol times, and optionally further using a power modulation for all or part of the beams.

The invention claimed is:

1. A method for transmission, from at least one emitter antenna, of a source signal that includes a plurality of binary sequences, to all or part of n receiver antennas, n being an integer greater than or equal to 2, the method implementing, before a step of emitting a given one of the binary sequences of the source signal, a prefiltering of focusing the given binary sequence towards one or more target antennas out of the n receiver antennas, the associated focusing prefiltering being chosen according to a value of the given binary sequence, the method further including:
  transmitting a first piece of binary information by using the simultaneous absence of focusing towards each of the n receiver antennas, during a predetermined integer k of symbol times.

2. The transmission method according to claim 1, further including:
  a modulation of power emitted by the at least one emitter antenna for encoding of a second piece of binary information.

3. The transmission method according to claim 2, wherein the second piece of binary information is identical to the first piece of binary information.

4. The transmission method according to claim 1, wherein the integer k of symbol times is less than or equal to 5.

5. The transmission method according to claim 2, wherein the power modulation includes:
a selection of an interval of power values from a predetermined integer p of intervals of power values.

6. A system comprising:
a processor;
a memory; and
a transmission application stored in the memory, wherein the transmission application, when executed on the processor, configures the processor to:
focus prefilter a given binary sequence towards one or more target antennas out of n receiver antennas, the associated focusing prefiltering being chosen according to a value of the given binary sequence, wherein a transmission of a source signal that includes a plurality of binary sequences is emitted from at least one emitter antenna, to all or part of the n receiver antennas, n being an integer greater than or equal to 2; and
transmit a first piece of binary information by using the simultaneous absence of focusing towards each of the n receiver antennas, during a predetermined integer k of symbol times.

7. A method for transmission, from at least one emitter antenna, of a source signal comprising a plurality of binary sequences, to all or part of n receiver antennas, n being an integer greater than or equal to 2, the method implementing, before emitting a given one of the binary sequences of the source signal, a prefiltering of focusing given binary sequence towards one or more target antennas out of the n receiver antennas, and the associated focusing prefiltering being chosen according to a value of the given binary sequence, the method further including:
transmitting a first piece of binary information by using the absence of focusing towards any one of the n receiver antennas, during a predetermined integer k of symbol times.

8. The method according to claim 7, further including:
a modulation of power emitted by the at least one emitter antenna for encoding of a second piece of binary information.

9. The method according to claim 8, wherein the second piece of binary information is identical to the first piece of binary information.

10. The method according to claim 7, wherein the integer k of symbol times is less than or equal to 4.

11. The transmission method according to claim 8, wherein the power modulation includes a selection of an interval of power values from a predetermined integer p of intervals of power values.

12. A system comprising:

a processor;

a memory; and a transmission application stored in the memory, wherein the transmission application, when executed on the processor, configures the processor to:

focus prefilter a given binary sequence towards one or more target antennas out of n receiver antennas, the associated focus prefilter being chosen according to a value of the given binary sequence, wherein a transmission of a source signal that includes a plurality of binary sequences is emitted from at least one emitter antenna, to all or part of the n receiver antennas, n being an integer greater than or equal to 2; and transmit a first piece of binary information by using the absence of focusing towards any one of the n receiver antennas, during a predetermined integer k of symbol times.

* * * * *